(12) United States Patent
Esaki et al.

(10) Patent No.: US 12,474,680 B2
(45) Date of Patent: Nov. 18, 2025

(54) CONTROL SYSTEM AND ACTION GENERATION METHOD

(71) Applicant: Hitachi, Ltd., Tokyo (JP)

(72) Inventors: Kanako Esaki, Tokyo (JP); Tadayuki Matsumura, Tokyo (JP); Hiroyuki Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 18/112,659

(22) Filed: Feb. 22, 2023

(65) Prior Publication Data

US 2023/0418251 A1    Dec. 28, 2023

(30) Foreign Application Priority Data

Jun. 23, 2022   (JP) ................................ 2022-100884

(51) Int. Cl.
*G05B 13/04* (2006.01)
*B25J 9/16* (2006.01)

(52) U.S. Cl.
CPC .......... *G05B 13/048* (2013.01); *B25J 9/1628* (2013.01); *G05B 2219/45063* (2013.01)

(58) Field of Classification Search
CPC ......... G05B 13/048; G05B 2219/45063; B25J 9/1628
See application file for complete search history.

(56) References Cited

U.S. PATENT DOCUMENTS

| 2009/0143932 | A1   | 6/2009  | Sekiya  |              |
|--------------|------|---------|---------|--------------|
| 2014/0067110 | A1\* | 3/2014  | Lawson  | H01L 21/67276 |
|              |      |         |         | 700/117      |
| 2019/0381657 | A1\* | 12/2019 | Ooba    | B25J 9/1692  |
| 2020/0223072 | A1\* | 7/2020  | Wagner  | B25J 9/1697  |

(Continued)

FOREIGN PATENT DOCUMENTS

| JP | 2009-131940 A | 6/2009 |
| JP | 2018015846 A  | 2/2018 |

(Continued)

OTHER PUBLICATIONS

Japanese Patent Office, Office Action, Application No. 2022-100884, dated Aug. 19, 2025, in 9 pages.

*Primary Examiner* — Michael W Choi
(74) *Attorney, Agent, or Firm* — PROCOPIO, CORY, HARGREAVES & SAVITCH LLP

(57) ABSTRACT

To act appropriately in consideration of uncertainty of a surrounding environment, it is provided a control system for generating an action for controlling a controlled device, comprising: a reception module configured to receive sensor data acquired by observing a state of a surrounding environment of the controlled device; a self-recognition module configured to derive, through use of a self-recognition prediction model that predicts a self-range being a range having a predictability and a controllability relating to the controlled device, a self-recognition block that defines the self-range from the sensor data; a target action prediction module configured to derive, through use of a target action (Continued)

prediction model that predicts a target action of the controlled device, the target action from the sensor data; and a switching module configured to select one of the self-recognition block or the target action in order to generate an action of the controlled device.

11 Claims, 8 Drawing Sheets

(56) References Cited

U.S. PATENT DOCUMENTS

| | | | |
|---|---|---|---|
| 2021/0214163 A1 | 7/2021 | Deacon et al. | |
| 2022/0401883 A1* | 12/2022 | Le Henaff | C02F 1/008 |
| 2023/0294277 A1* | 9/2023 | Yang | G05B 19/4155 |
| | | | 700/217 |

FOREIGN PATENT DOCUMENTS

| | | | | |
|---|---|---|---|---|
| JP | 2021524812 A | 9/2021 | | |
| SE | 202150082 A1 * | 1/2021 | | G06F 3/01 |
| WO | 2019229181 A1 | 12/2019 | | |
| WO | WO-2021044751 A1 * | 3/2021 | | B25J 13/08 |

* cited by examiner

CONTROL SYSTEM AND ACTION GENERATION METHOD

CLAIM OF PRIORITY

The present application claims priority from Japanese patent application JP 2022-100884 filed on Jun. 23, 2022, the content of which is hereby incorporated by reference into this application.

BACKGROUND OF THE INVENTION

This invention relates a control system, and more particularly, to an action generation method of generating an action for controlling a controlled device.

An autonomous system which coexists with humans is expected in a daily life space of the humans. It is required for the autonomous system coexisting with the humans to act under a state in which uncertainty of an environment (including the humans) around the system is not resolved. For example, it is required for a robot to execute a picking operation in a vicinity of a person whom the robot meets for the first time and hence whose action is hard to predict.

The following related art is known as the background art in this technical field. In JP 2009-131940A, there is described a mobile apparatus comprising a control device and having an operation controlled by the control device to autonomously move along a target trajectory representing change modes in a target position defined in a two-dimensional model space, the control device including a first processing unit, a second processing unit, and a third processing unit, wherein the first processing unit recognizes a region through which the mobile apparatus is capable of passing as an element passing region in the model space, recognizes the mobile apparatus and a trajectory representing a change mode of a position of the mobile apparatus as a first spatial element and a first trajectory representing a change mode of a first position, respectively, recognizes an object and a trajectory representing a change mode of a position of the object as a second spatial element and a second trajectory representing a change mode of a second position, respectively, and recognizes the second spatial element continuously or intermittently expanded in accordance with the change mode in the second position as an expanded second spatial element, wherein the second processing unit determines whether or not a first safety condition specifying that a possibility of contact between the first spatial element and the second spatial element in the element passing region is low is satisfied based on a recognition result by the first processing unit, wherein the third processing unit searches for a first target trajectory allowing the first spatial element to avoid contact with the expanded second spatial element in the element passing region based on the recognition result by the first processing unit on a condition that the second processing unit determines that the first safety condition is not satisfied, wherein the second processing unit determines whether or not a second safety condition specifying that the first target trajectory has been searched for by the third processing unit is satisfied, wherein the third processing unit searches for a second target trajectory causing the first spatial element to approach a boundary of the element passing region based on the recognition result by the first processing unit on a condition that the second processing unit determines that the second safety condition is not satisfied, and wherein the control device controls the operation of the mobile apparatus by regarding the first target trajectory as the target trajectory in a case where the third processing unit determines that the second safety condition is satisfied, whereas the control device controls the operation of the mobile apparatus by regarding the second target trajectory provisionally as a target trajectory and regarding a position corresponding to an end point of the second target trajectory as a stop position in a case where the second target trajectory has been searched for by the third processing unit.

SUMMARY OF THE INVENTION

The related-art autonomous system searches an environment around the system for optimization toward a target of the system while assuming an action after uncertainty of the environment is sufficiently resolved. Thus, there is a problem in that the autonomous system cannot act unless the uncertainty of the environment is resolved.

This invention has an object to cause an autonomous system to act appropriately in consideration of uncertainty of a surrounding environment.

The representative one of inventions disclosed in this application is outlined as follows. There is provided a control system for generating an action for controlling a controlled device, comprising: a reception module configured to receive sensor data acquired by observing a state of a surrounding environment of the controlled device; a self-recognition module configured to derive, through use of a self-recognition prediction model that predicts a self-range being a range having a predictability and a controllability relating to the controlled device, a self-recognition block that defines the self-range from the sensor data; a target action prediction module configured to derive, through use of a target action prediction model that predicts a target action of the controlled device, the target action from the sensor data; and a switching module configured to select one of the self-recognition block or the target action in order to generate an action of the controlled device.

According to the at least one aspect of this invention, the autonomous system can appropriately act in consideration of the uncertainty of the surrounding environment. Problems, configurations, and effects other than those described above become apparent through the following description of embodiments.

DETAILED DESCRIPTION OF THE PREFERRED EMBODIMENTS

Description is first given of an overview of a control system 100 according to embodiments of this invention. The control system 100 searches an entire environment including a controlled device such that the environment is separated in terms of a predictability indicating a degree of prediction of an action of a target object controlled by the controlled device and a controllability which indicates whether or not the controlled device can control the target object, to thereby generate an action in consideration of uncertainty of the environment. Thus, the control system 100 has a function of recognizing the self and the others separately and a function of generating an action based on a result of the recognition of the self.

The function of recognizing the self and the others separately moves a portion already recognized as the self to check the controllability and the predictability of a target object for which whether self or other is unknown (that is, none of the predictability and the controllability are clear) and a relatively vague self (the controllability is clear, but the predictability is unknown). The function of generating an action based on the result of the recognition of the self generates a clear action of the self in consideration of the predictability of the vague self. As a result, for example, when a target object whose behavior is hard to predict is to be gripped and stored, a trajectory having a margin can be generated, and hence it is possible to prevent interference between the target object and objects in the environment.

The control system 100 according to the embodiments generates an action of an autonomous system being a controlled device (for example, a robot or a self-driving vehicle). However, the control system 100 may be a control device implemented in the controlled device which autonomously acts, or may be a control device constructed separately from the autonomous system being the controlled device.

First Embodiment

Figure 1:
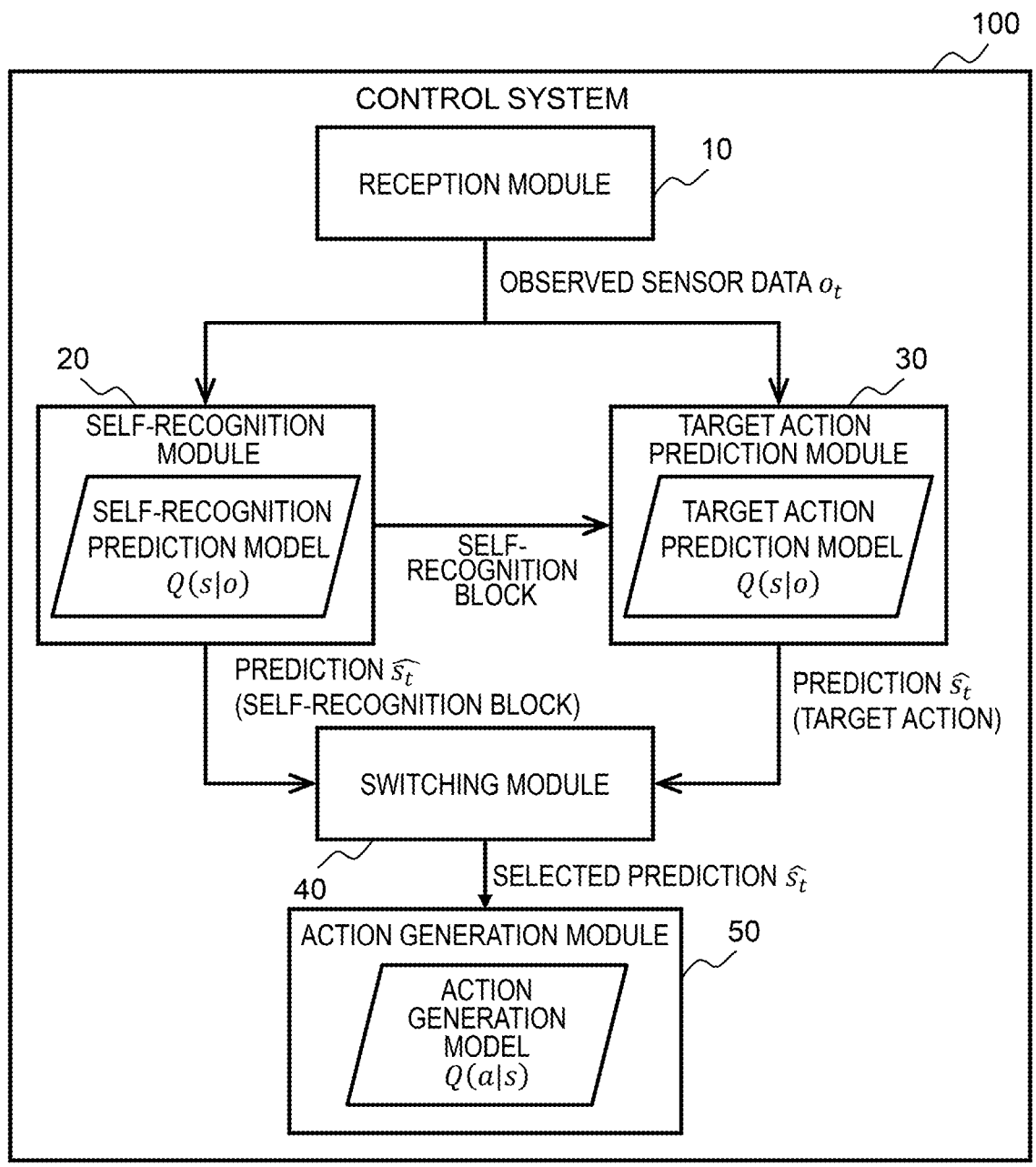
FIG. 1 is a block diagram for illustrating a logical configuration of a control system according to a first embodiment of this invention.

FIG. 1 is a block diagram for illustrating a logical configuration of the control system 100 according to a first embodiment of this invention.

The control system 100 includes a reception module 10, a self-recognition module 20, a target action prediction module 30, a switching module 40, and an action generation module 50.

The reception module 10 receives sensor data indicating a state of the surrounding environment of the control system 100. The sensor data received by the reception module 10 is, for example, information on positions and shapes of a target object (for example, a gripping target object) and surrounding objects observed by a camera, LiDAR, a radar, or the like and a travel state and motions of arms (joints) observed by encoders provided to the robot.

The self-recognition module 20 uses a self-recognition prediction model which predicts a self-range being a range in which the prediction and the control by the control system 100 are exerted to define the self-range from the sensor data. The self-recognition prediction model is generated for each object for which a self-recognition block is to be predicted, and can be formed of a neural network model which has learned through use of the sensor data and a range of this object recognized as self (self-recognition block). For example, the self-recognition module 20 inputs, to the self-recognition prediction model, the sensor data obtained by observing a position and a posture of the robot, derives the self-recognition block, and outputs the self-recognition block to the target action prediction module 30 and the switching module 40. The self-recognition block output from the self-recognition module 20 indicates a predicted position of a target object (for example, a gripping target object) controlled by the controlled device.

The target action prediction module 30 uses a target action prediction model which predicts a target action of the control system 100 to derive a target action from the observed sensor data and the self-recognition block, and outputs the target action to the switching module 40. The target action prediction model can be formed through use of the free-energy principle. In accordance with the target action prediction model which uses the free-energy principle, a future target action is determined such that a cost function indicating free energy is minimized. For example, the target action prediction module 30 derives a future motion of the robot arm from the motion of the arm. The target action prediction module 30 may output a plurality of target actions each having a probability.

The switching module 40 selects which of the self-recognition block and the target action is to be used by the action generation module 50 to generate the action, and outputs a prediction result based on the selection result.

The action generation module 50 uses an action generation model to generate the action from the prediction result (self-recognition block or target action) output from the switching module 40. The action generation module 50 generates, for example, an action in which the controlled device grips the gripping target object to move the gripping target object to a predetermined place or an action in which the controlled device guides a person while the controlled device is apart from the person by a predetermined distance so that the controlled device does not interfere with the person. It is preferred that the action generation model be created through use of a rule base in advance. The action generation model generates an action in which the self-recognition block does not interfere with surrounding objects, or generates an action in accordance with the target action. The action generation module 50 may be provided outside the control system 100. In this case, the control system 100 may output a prediction result $s_t$ to the controlled device, and the controlled device may generate the action.

Figure 2:
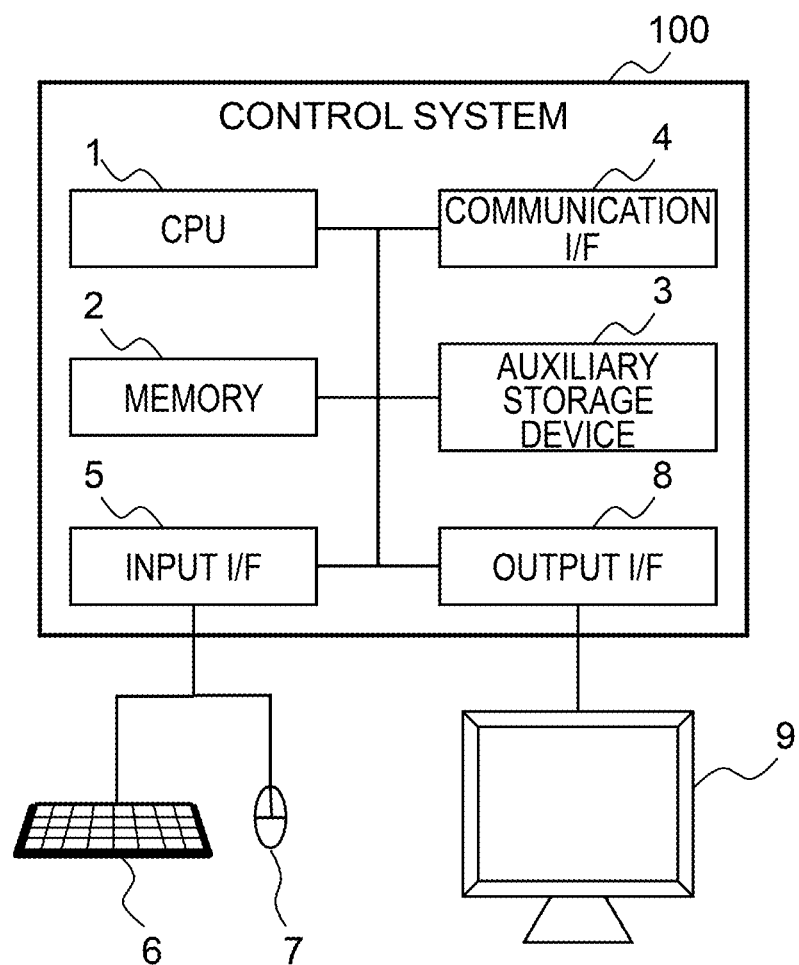
FIG. 2 is a block diagram for illustrating a physical configuration of the control system according to the first embodiment.

FIG. 2 is a block diagram for illustrating a physical configuration of the control system 100 according to the first embodiment.

The control system 100 according to the first embodiment is formed of a computer which includes a processor (CPU) 1, a memory 2, an auxiliary storage device 3, and a communication interface 4. The control system 100 may include an input interface 5 and an output interface 8.

The processor 1 is a calculation device which executes programs stored in the memory 2. Functions provided by the respective function modules (for example, the reception module 10, the self-recognition module 20, the target action prediction module 30, the switching module 40, and the action generation module 50) of the control system 100 are implemented by the processor 1 executing the various programs. A part of processing executed by the processor 1 executing the program may be executed by another calculation device (for example, hardware such as an ASIC and an FPGA).

The memory 2 includes a ROM which is a nonvolatile memory device and a RAM which is a volatile memory device. The ROM stores an invariable program (for example, BIOS) and the like. The RAM is a high-speed and volatile memory device such as a dynamic random access memory (DRAM), and temporarily stores the program to be executed by the processor 1 and data used when the program is executed.

The auxiliary storage device 3 is a high-capacity and nonvolatile storage device such as a magnetic storage device (HDD) and a flash memory (SSD). Moreover, the auxiliary storage device 3 stores the data used when the processor 1 executes the program and the program to be executed by the processor 1. That is, the program is read out from the auxiliary storage device 3, is loaded on the memory 2, and is executed by the processor 1, to thereby implement each function of the control system 100.

The communication interface 4 is a network interface device which controls communication to and from other devices in accordance with a predetermined protocol.

The input interface 5 is an interface to which input devices such as a keyboard 6 and a mouse 7 are coupled and which receives input from an operator. The output interface 8 is an interface to which output devices such as a display device 9 and a printer (not shown) are coupled, and which outputs an execution result of the program in a form that allows the user to visually recognize the execution result. A user terminal coupled to the control system 100 via a network may provide the input device and the output device. In this case, the control system 100 may have a function of a web server, and the user terminal may access the control system 100 in accordance with a predetermined protocol (for example, http).

The program executed by the processor 1 is provided to the control system 100 through a removable medium (such as a CD-ROM and a flash memory) or the network, and is stored in the non-volatile auxiliary storage device 3 being a non-transitory storage medium. Thus, it is preferred that the control system 100 have an interface for reading data from the removable medium.

The control system 100 is a computer system implemented on physically one computer or implemented on a plurality of computers that are configured logically or physically, and may operate on a virtual machine built on a plurality of physical computer resources. For example, each of the reception module 10, the self-recognition module 20, the target action prediction module 30, the switching module 40, and the action generation module 50 may operate on a separate physical or logical computer, or a plurality of those modules may be combined to operate on one physical or logical computer.

Figure 3A:
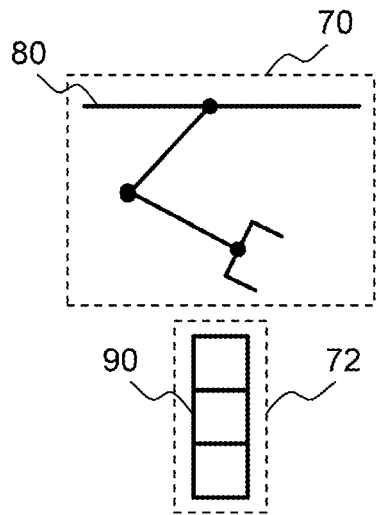
FIG. 3A is a diagram for illustrating an example of a self and the other before a gripping target object is gripped.
Figure 3B:
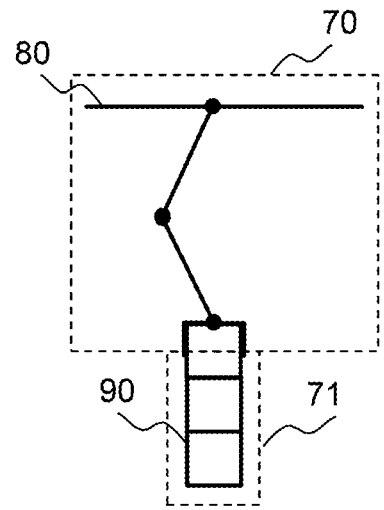
FIG. 3B is a diagram for illustrating an example of the self and the other immediately after the gripping target object is gripped.
Figure 3C:
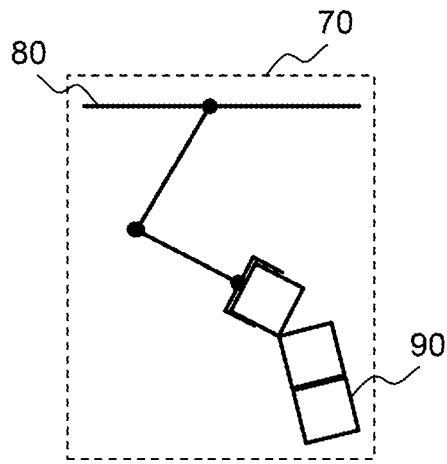
FIG. 3C is a diagram for illustrating an example of the self and the other for a certain period to move the gripping target object.

FIG. 3A to FIG. 3C are diagrams for illustrating examples of the self and the other in the controlled device divided by the control system 100.

The control system 100 divides an entire environment including the controlled device (robot) into the self and the other in terms of the controllability and the predictability. The controllability means that it is possible to execute an operation of controlling a portion which has already been known as "self" to change a shape, a motion, and the like thereof. The predictability means that the change in shape and motion can be predicted. The self is considered as not only the robot itself, but also as an extended self.

Description is now given of the self and the other in an example of a gripping and storing task executed by a robot 80. Link lengths, movable ranges, and the like of the robot 80 are known, and the robot itself is a portion which is already known as "self" 70. A gripping target object 90 is an object formed of a plurality of objects coupled at faces or sides in a form of a rosary, and is an object whose shape cannot be recognized before gripping. As illustrated in FIG. 3A, the position and the shape of the gripping target object 90 do not change through an action of the robot before the robot grips the gripping target object 90, and hence the gripping target object 90 does not have the controllability. Moreover, the gripping target object 90 has been positioned at its place for a certain period, and hence it is predicted that the gripping target object 90 remains at this place in the future. Thus, the gripping target object 90 has the predictability. As a result, at the stage of FIG. 3A, the gripping target object 90 is determined as "other" 72.

As illustrated in FIG. 3B, the position and the shape of the gripping target object 90 may change through an action of the robot 80 immediately after the robot 80 grips the gripping target object 90, and hence the gripping target object 90 has the controllability. Moreover, ways of changes in the position and the shape of the gripping target object 90 due to the action of the robot 80 are not known, and hence the predictability of the gripping target object 90 is low. As a result, at the stage of FIG. 3B, the gripping target object 90 is determined as "vague self" 71.

As illustrated in FIG. 3C, when the robot 80 has been controlled to move the gripping target object 90 and a certain period has elapsed, it is known that the position and the shape of the gripping target object 90 change as a result of the action of the robot 80. Thus, the gripping target object 90 has the controllability. Moreover, ways of changes in the position and the shape of the gripping target object 90 due to the action of the robot 80 are known, and hence the gripping target object 90 has high predictability. Thus, at the stage of FIG. 3C, the gripping target object 90 is determined as "self" 70.

FIG. 4A to FIG. 4D are diagrams for illustrating an example of the self-recognition block of the gripping target object 90 to be gripped by the controlled device (robot 80) in the control system 100.

In the gripping and storing task by the robot 80, a self-recognition block 95 is generated when the gripping target object 90 has the controllability. A size of the self-recognition block 95 is determined based on the predictability of the target object.

Figure 4A:
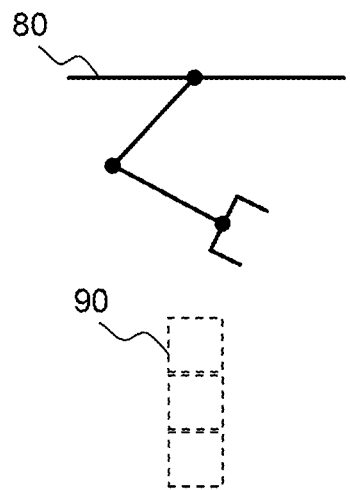
FIG. 4A is a diagram for illustrating an example of the self-recognition block of the gripping target object before the gripping target object is gripped.
Figure 4B:
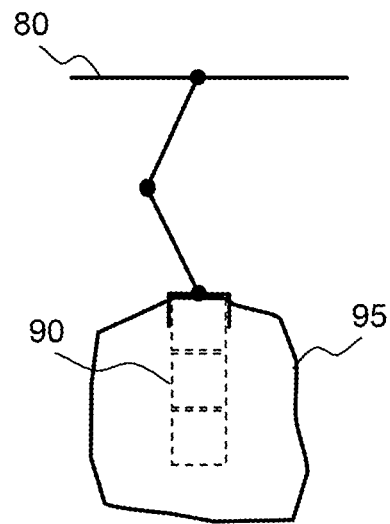
FIG. 4B is a diagram for illustrating an example of the self-recognition block of the gripping target object immediately after the gripping target object is gripped.
Figure 4C:
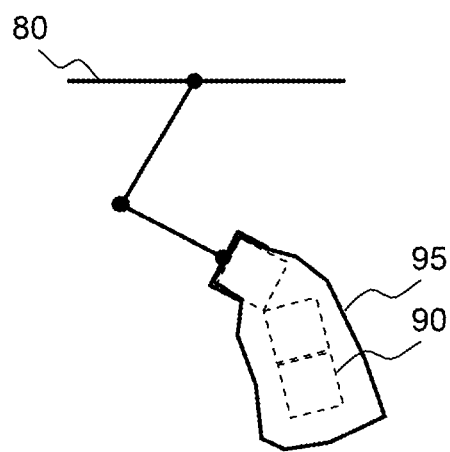
FIG. 4C is a diagram for illustrating an example of the self-recognition block of the gripping target object for a certain period to move the gripping target object.
Figure 4D:
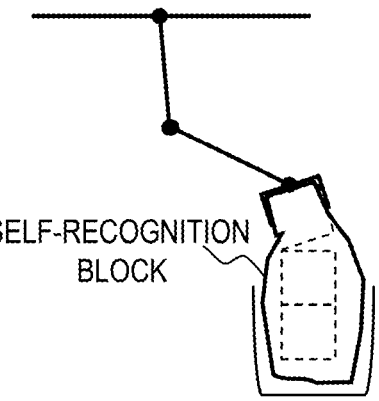
FIG. 4D is a diagram for illustrating an example of the self-recognition block of the gripping target object at a stage at which the gripping target object is to be stored.

For a simpler description, only the self-recognition block 95 corresponding to the gripping target object 90 is illustrated, and a self-recognition block corresponding to the robot 80 is omitted. As illustrated in FIG. 4A, before the gripping target object is gripped, the gripping target object 90 is "the other" which does not have the controllability and has the predictability, and hence the self-recognition block 95 is not generated. As illustrated in FIG. 4B, immediately after the gripping target object 90 is gripped, the gripping target object 90 has the controllability, and hence the self-recognition block 95 is generated. The size of the self-recognition block 95 is calculated based on the predictability. For example, the size of the self-recognition block 95 can be calculated through use of accuracies (reciprocals of variances) of inference distributions of a position and a posture of the gripping target object 90 with respect to a position and a posture of the robot 80. As illustrated in FIG. 4C, after the robot 80 is controlled for a certain period to move the gripping target object 90, the variances of the inference distribution are small. Thus, the predictability increases compared with that immediately after the gripping target object 90 is gripped, and the size of the self-recognition block 95 decreases compared with that immediately after the gripping target object 90 is gripped. When the self-recognition block 95 is considered as an actual gripping target object 90, it is possible to prevent interference with other objects. For example, it is possible to prevent an unexpected collision with another moving body (or a remote control device) by notifying the another moving body of the self-recognition block 95. Further, as illustrated in FIG. 4D, at a stage at which the gripping target object 90 is to be stored, a storing trajectory is calculated while considering the self-recognition block 95 as the actual gripping target object 90. When the predictability is low, the self-recognition block 95 is large. Thus, the storing trajectory has a margin with respect to a storage box. The calculation of the trajectory while considering the self-recognition block 95 as the actual gripping target object 90 corresponds to revealing, as observed values, the position and the posture of the object with respect to the position and the posture of the robot 80 in a hidden state. The control system 100 reveals the hidden state as the observed values, thereby being capable of determining the action in consideration of uncertainty of the environment at each time during the execution of the task.

Figure 5:
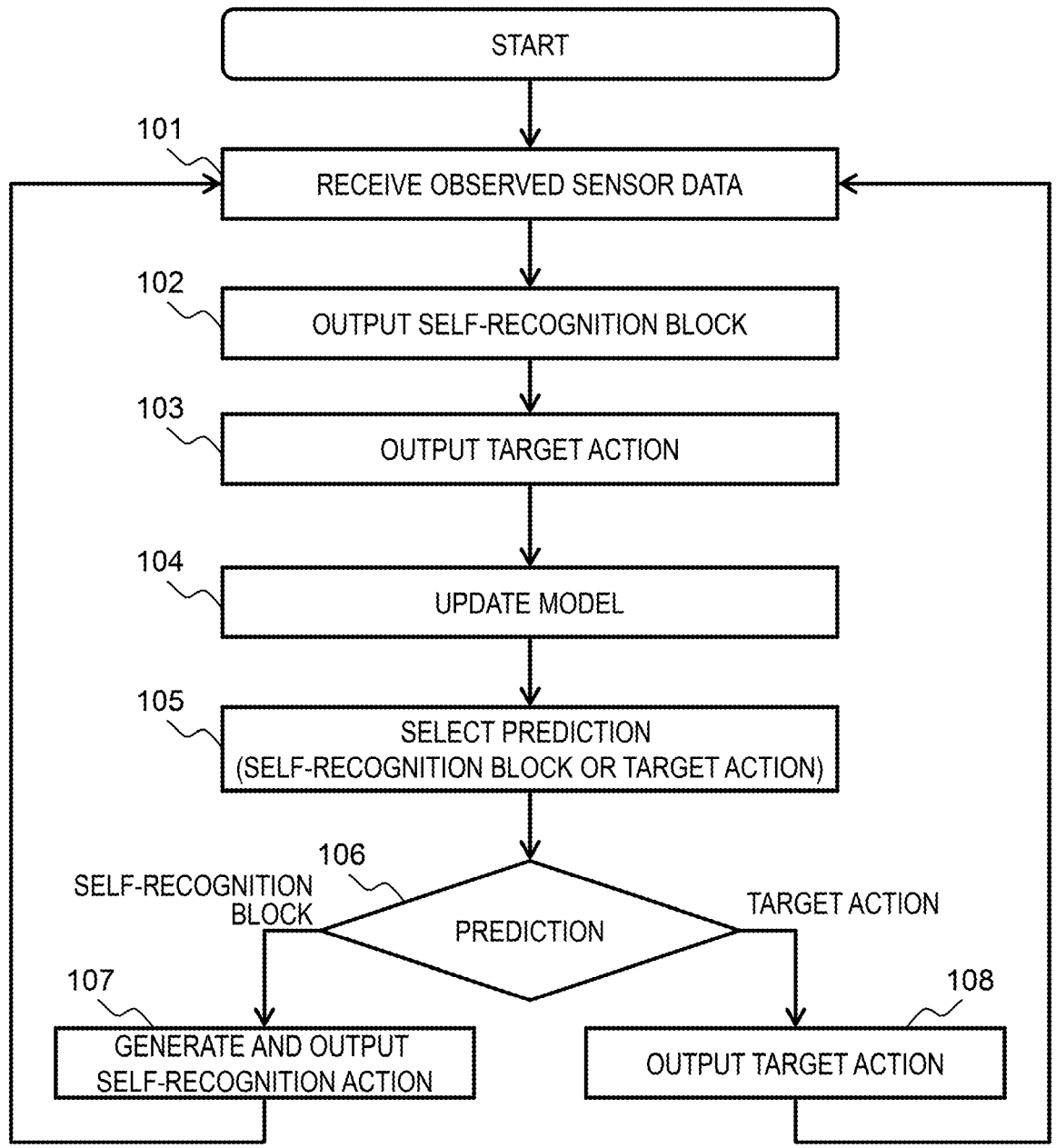
FIG. 5 is a flowchart of processing executed by the control system according to the first embodiment.

FIG. 5 is a flowchart of processing executed by the control system 100 according to the first embodiment.

First, the reception module 10 receives the sensor data (Step 101). The self-recognition module 20 uses the self-recognition prediction model to calculate the self-recognition block from the sensor data, and outputs the self-recognition block (Step 102).

The target action prediction module 30 uses the target action prediction model to calculate the target action from the observed sensor data, and outputs the target action (Step 103). For example, in the case of the gripping and storing task by the robot, a target action for storing the gripping target object is output. After that, the self-recognition module 20 updates the self-recognition prediction model, and the target action prediction module 30 updates the target action prediction model (Step 104). The observed sensor data and the self-recognition block are used to update the self-recognition prediction model. The observed sensor data and the target action are used to update the target action prediction model. The switching module 40 selects which of the self-recognition block and the target action is to be used (Step 105). Details of the processing by the switching module 40 are described with reference to FIG. 6A to FIG. 6C. After that, when the switching module 40 selects the self-recognition block, the action generation module 50 uses the action generation model to generate an action (self-recognition action of controlling the robot to change the position, the shape, and the motion of the gripping target object) from the self-recognition prediction model, and outputs the action (Step 107). Meanwhile, when the switching module 40 selects the target action, the action generation module 50 outputs an action in accordance with the target action output from the target action prediction module 30 (Step 108).

Figure 6A:
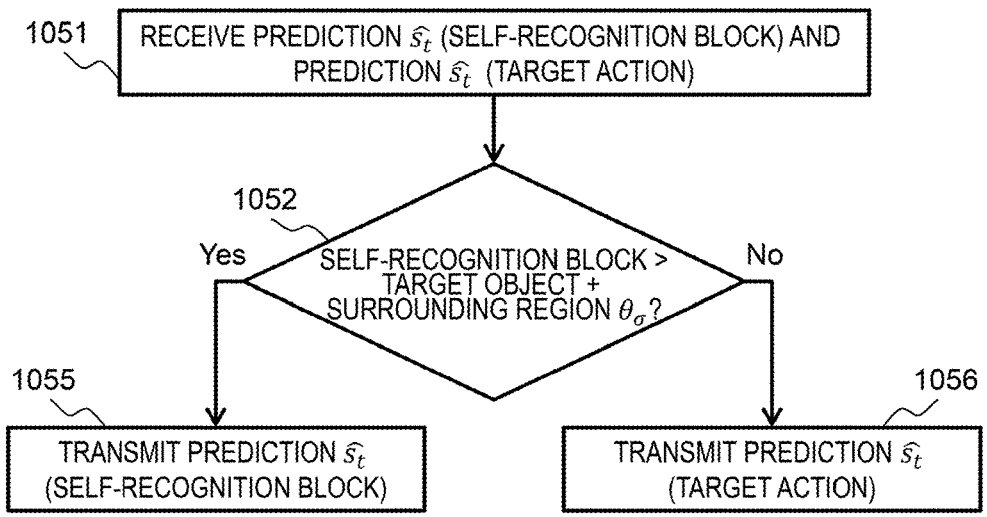
FIG. 6A is a flowchart of the processing (pattern 1) executed by the switching module according to the first embodiment.
Figure 6B:
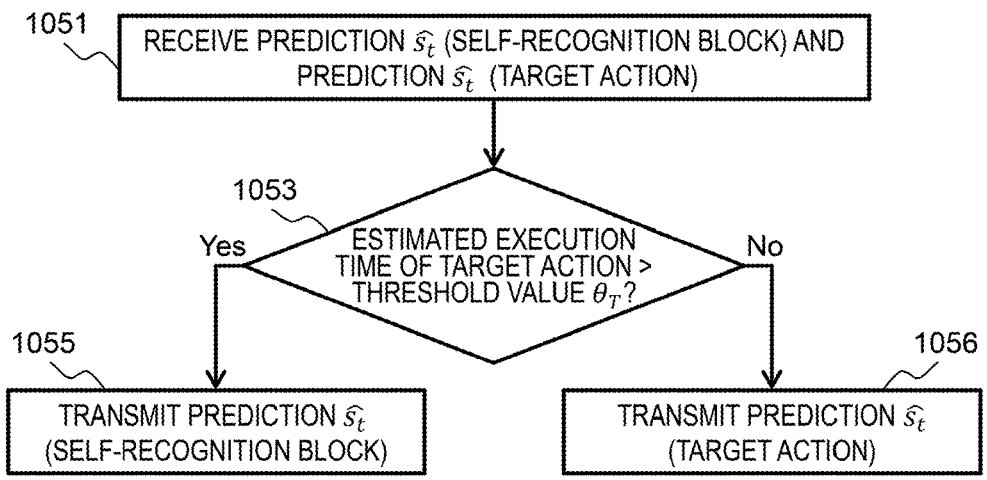
FIG. 6B is a flowchart of the processing (pattern 2) executed by the switching module according to the first embodiment.
Figure 6C:
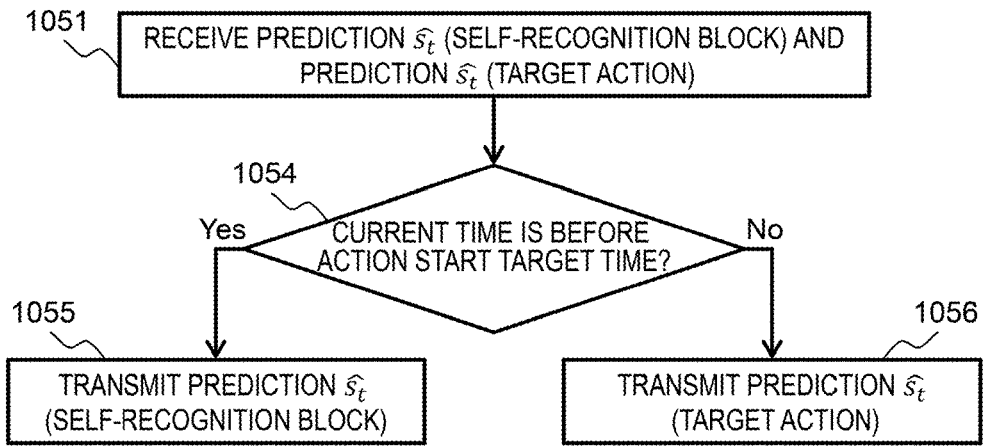
FIG. 6C is a flowchart of the processing (pattern 3) executed by the switching module according to the first embodiment.

FIG. 6A to FIG. 6C are flowcharts of the processing executed by the switching module 40.

There are illustrated representative three patterns of the processing executed by the switching module 40. The processing executed by the switching module 40 are not limited to those patterns. Moreover, those patterns may be combined.

Regarding those patterns, (1) one pattern may be selected in accordance with setting of the user, (2) the self-recognition block may be selected when the self-recognition block is determined to be selected in all of the patterns in accordance with a logical AND of the determination results of all of the patterns, and (3) the determination results of the plurality of patterns are made into scores, and any one of the self-recognition block and the target action may be selected based on total points (for example, a weighted sum) of those scores.

FIG. 6A is a flowchart of the processing (pattern 1) executed by the switching module 40. In the pattern 1, the switching module 40 receives the prediction result (self-recognition block) from the self-recognition module 20, and receives the target action from the target action prediction module 30 (Step 1051). The switching module 40 compares the size of the self-recognition block and a sum of the actual size of the gripping target object and a size $\theta_o$ of a surrounding region set in advance (Step 1052). After that, the switching module 40 selects the self-recognition block when the size of the self-recognition block is larger than the sum of the actual size of the gripping target object and the size $\theta_o$ of the surrounding region set in advance, and outputs the self-recognition block to the action generation module 50 (Step 1055). Meanwhile, the switching module 40 selects the target action when the size of the self-recognition block is equal to or smaller than the sum of the actual size of the gripping target object and the size $\theta_o$ of the surrounding region, and outputs the target action to the action generation module 50 (Step 1056). The pattern 1 is effective when there exists a time margin until the gripping target object is to be stored, and the predictability is currently low, and hence is required to be increased.

FIG. 6B is a flowchart of the processing (pattern 2) executed by the switching module 40. In the pattern 2, the switching module 40 receives the prediction result (self-recognition block) from the self-recognition module 20, and receives the target action from the target action prediction module 30 (Step 1051). The switching module 40 compares an estimated execution time of the target action predicted by the target action prediction module 30 and a threshold value $\theta_T$ set in advance with each other (Step 1053). After that, the switching module 40 selects the self-recognition block when the estimated execution time is longer than the threshold value $\theta_T$ (Step 1055). The action generation module 50 abandons the storing of the gripping target object, and generates an action of increasing precision of the self-recognition block. Meanwhile, the switching module 40 selects the target action when the estimated execution time is equal to or shorter than the threshold value $\theta_T$, and outputs the target action to the action generation module 50 (Step 1056). The estimated execution time is estimated by the target action prediction module 30. The pattern 2 is effective when it is required to suppress the time for storing the gripping target object to a certain time (for example, the gripping target object is to be stored in a storage box being conveyed on a conveyor belt).

FIG. 6C is a flowchart of the processing (pattern 3) executed by the switching module 40. In the pattern 3, the switching module 40 receives the prediction result (self-recognition block) from the self-recognition module 20, and receives the target action from the target action prediction module 30 (Step 1051). The switching module 40 compares a current time and an action start target time with each other (Step 1054). After that, the switching module 40 selects the self-recognition block when the current time is before the action start target time, and outputs the self-recognition block to the action generation module 50 (Step 1055). The action generation module 50 generates a self-recognition action in order to increase the precision of the self-recognition block until the action start target time. Meanwhile, the switching module 40 selects the target action when the current time is after the action start target time, and outputs the target action to the action generation module 50 (Step 1056). The pattern 3 is effective when the time to store the gripping target object is determined, and the predictability is to be increased until the action start target time.

As described above, according to the control system 100 of the first embodiment, the input to the action generation model of the controlled device can be changed through the selection of the self-recognition block or the target action by the switching module 40, thereby being capable of generating an action based on the self-recognition block defining a self-range as required. Thus, an appropriate action in consideration of the uncertainty of the surrounding environment can be taken.

Second Embodiment

In a second embodiment of this invention, the switching module 40 requests the target action, and the target action prediction module 30 generates an action in accordance with the request for the target action. In the second embodiment, description is mainly given of differences from the above-mentioned first embodiment, and description of the same configurations and functions as those in the first embodiment is omitted.

Figure 7:
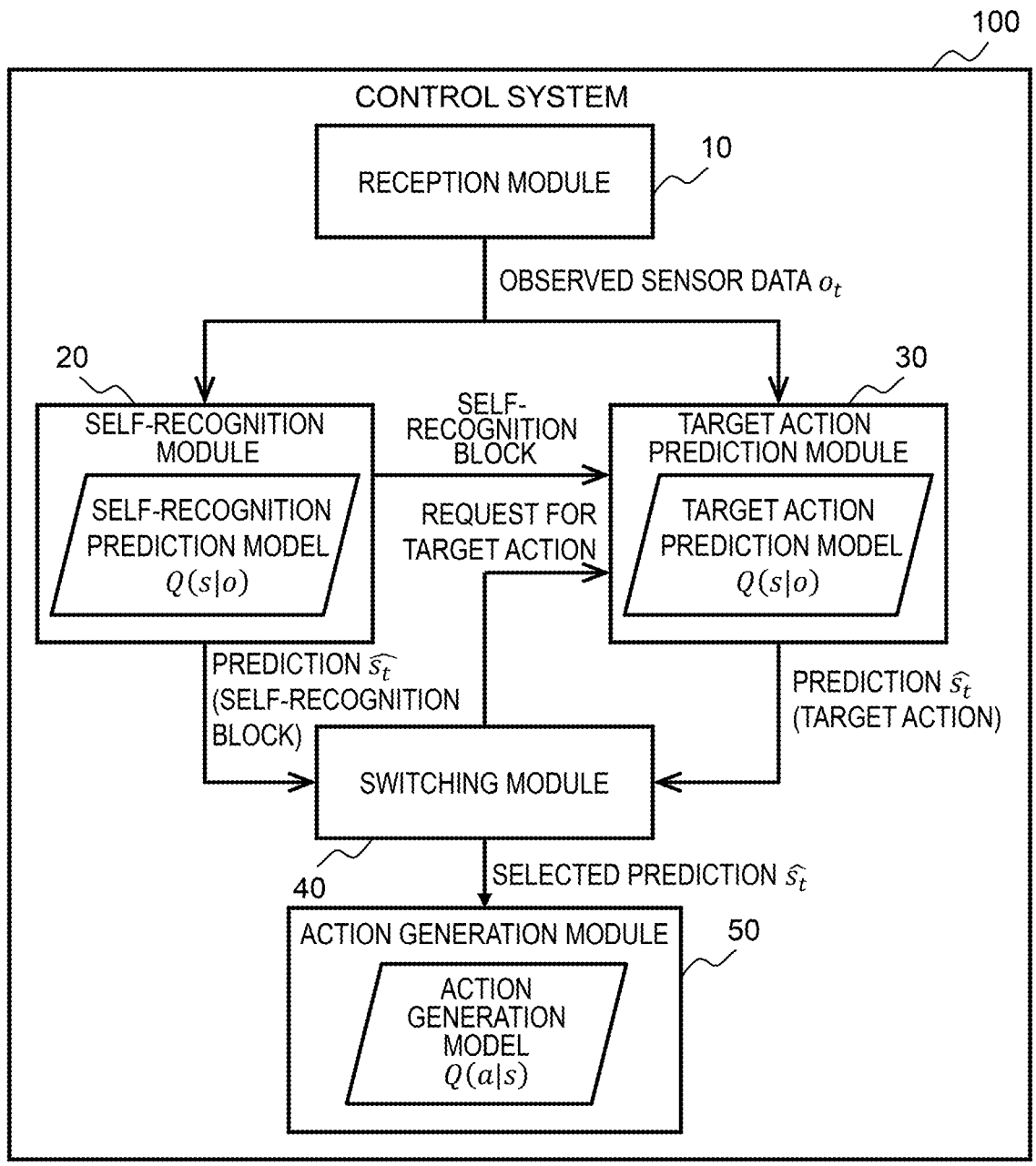
FIG. 7 is a block diagram for illustrating a logical configuration of the control system according to the second embodiment.

FIG. 7 is a block diagram for illustrating a logical configuration of the control system 100 according to the second embodiment.

The control system 100 includes the reception module 10, the self-recognition module 20, the target action prediction module 30, the switching module 40, and the action generation module 50. Functions and configurations of the reception module 10, the self-recognition module 20, and the action generation module 50 are the same as those in the above-mentioned first embodiment.

The target action prediction module 30 uses, in accordance with the target action request from the switching module 40, a target action prediction model which predicts a target action of the control system 100 to derive a target action from the observed sensor data and the self-recognition block, and outputs the target action to the switching module 40. The target action prediction model can be formed through use of the free-energy principle. In accordance with the target action prediction model which uses the free-energy principle, a future target action is determined such that a cost function indicating free energy is minimized. For example, the target action prediction module 30 derives a future motion of the robot arm from the motion of the arm. The target action prediction module 30 may output a plurality of target actions each having a probability.

The switching module 40 selects which of the self-recognition block and the target action is to be used by the action generation module 50 to generate the action. When the switching module 40 selects the target action, the switching module 40 requests the target action prediction module 30 for the target action.

Figure 8:
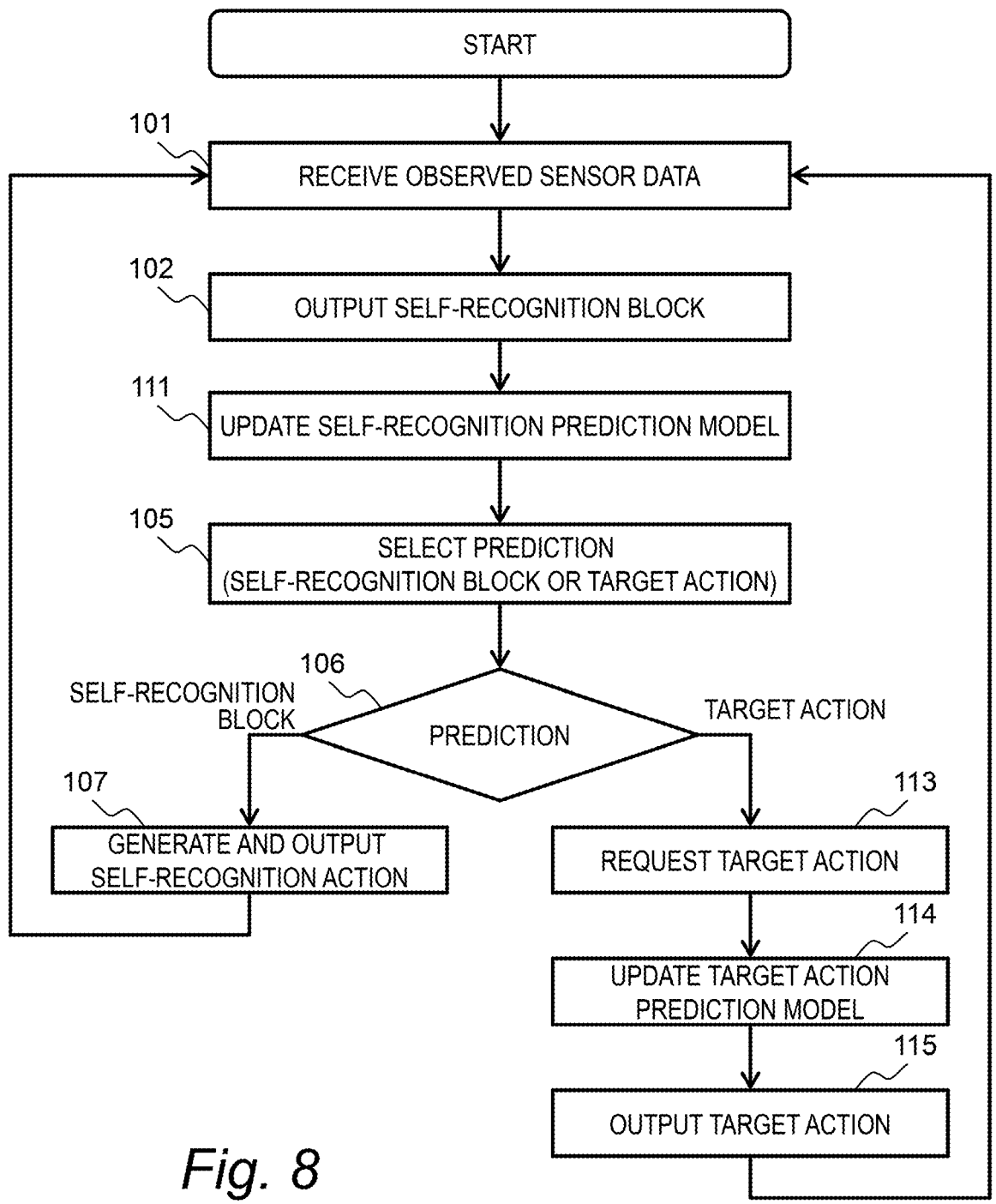
FIG. 8 is a flowchart of the processing executed by the control system according to the second embodiment.

FIG. 8 is a flowchart of the processing executed by the control system 100 according to the second embodiment.

First, the reception module 10 receives the sensor data (Step 101). The self-recognition module 20 uses the self-recognition prediction model to calculate the self-recognition block from the sensor data, and outputs the self-recognition block (Step 102). After that, the self-recognition module 20 updates the self-recognition prediction model (Step 111). The observed sensor data and the self-recognition block are used to update the self-recognition prediction model. The switching module 40 selects which of the self-recognition block and the target action is to be used (Step 105). Details of the processing by the switching module 40 are as described above with reference to FIG. 6A to FIG. 6C. After that, when the switching module 40 selects the self-recognition block, the action generation module 50 uses the action generation model to generate an action (self-recognition action of controlling the robot to change the position, the shape, and the motion of the gripping target object) from the self-recognition prediction model, and outputs the action (Step 107). Meanwhile, when the switching module 40 selects the target action, the switching module 40 requests the target action prediction module 30 for the target action (Step 113). When the target action prediction module 30 receives the target action request, the target action prediction module 30 updates the target action prediction model (Step 114). The observed sensor data and the target action are used to update the target action prediction model. After that, the target action prediction module 30 uses the target action prediction model to calculate the target action from the observed sensor data, and outputs the target action. When the switching module 40 selects the target action, the action generation module 50 outputs an action in accordance with the target action output from the target action prediction module 30 (Step 115).

As described above, according to the control system 100 of the second embodiment, when the switching module 40 selects the target action, the switching module 40 requests the target action prediction module 30 for the target action. Thus, it is possible to reduce a calculation load on the target action prediction module 30, and an appropriate action can be derived by using a small calculation resource.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A control system, comprising:
an autonomous robot; and
a processor in communication with the autonomous robot, wherein the processor is configured to:
receive sensor data acquired by observing a state of a surrounding environment of the autonomous robot;
derive, through use of a self-recognition prediction model that predicts a self-range being a range having a predictability and a controllability relating to the autonomous robot, a self-recognition block that defines the self-range from the sensor data, wherein the self-recognition block indicates a predicted position of a target object controlled by the autonomous robot;
derive, through use of a target action prediction model that predicts a target action of the autonomous robot, the target action from the sensor data; and
select one of the self-recognition block or the target action in order to generate an action of the autonomous robot; and
generate, based on the selected one of the self-recognition block or the target action, a trajectory for the autonomous robot to move the target object while preventing interference between the target object and surrounding objects.

2. The control system according to claim 1,
wherein the predictability means being able to predict a change in a shape and a motion of the target object controlled by the autonomous robot, and
wherein the controllability means changing the shape and the motion through the action of the autonomous robot.

3. The control system according to claim 1, wherein the processor is configured to select the self-recognition block in a case where a size of the self-recognition block is larger than a sum of a size of the target object controlled by the autonomous robot and a size of a predetermined surrounding region.

4. The control system according to claim 1, wherein the processor is configured to select the self-recognition block in a case where an estimated execution time derived by the target action prediction module is longer than a predetermined threshold value.

5. The control system according to claim 4, wherein the processor is further configured to generate, through use of an action generation model, an action from one of the self-recognition block or the selected target action,
wherein in a case where the self-recognition block is selected, the processor is configured to abandon an original action relating to the target object controlled by the autonomous robot, and to generate an action of increasing precision of the self-recognition block.

6. The control system according to claim 1, wherein the processor is configured to select the self-recognition block in a case where a current time is before an action start target time.

7. The control system according to claim 6, wherein the processor is further configured to generate, through use of an action generation model, an action from one of the self-recognition block or the selected target action,
wherein the processor is configured to generate an action of increasing precision of the self-recognition block until the action start target time.

8. The control system according to claim 1, wherein the processor is further configured to generate, through use of an action generation model, from one of the self-recognition block or the selected target action, an action in which the autonomous robot grips a gripping target object and moves the gripping target object.

9. The control system according to claim 1, wherein the processor is further configured to generate, through use of an action generation model, from one of the self-recognition block or the selected target action, an action in which the autonomous robot guides a person such that the autonomous robot does not interfere with the person.

10. The control system according to claim 1, wherein the processor is further configured to:
update the self-recognition prediction model through use of the sensor data, and
update the target action prediction model through use of the sensor data.

11. An action generation method, which is executed by a control system for generating an action for controlling a autonomous robot,
the control system including a calculation device configured to execute predetermined calculation processing, and a storage device coupled to the calculation device,
the action generation method comprising:
a reception step of receiving, by the calculation device, sensor data acquired by observing a state of a surrounding environment of the autonomous robot;
a self-recognition step of deriving, by the calculation device, through use of a self-recognition prediction model that predicts a self-range being a range having a predictability and a controllability relating to the autonomous robot, a self-recognition block that defines the self-range from the sensor data, wherein the self-recognition block indicates a predicted position of a target object controlled by the autonomous robot;
a target action prediction step of deriving, by the calculation device, through use of a target action prediction model that predicts a target action of the autonomous robot, the target action from the sensor data; and
a switching step of selecting, by the calculation device, one of the self-recognition block or the target action in order to generate an action of the autonomous robot; and
a generation step of generating, based on the selected one of the self-recognition block or the target action, a trajectory for the autonomous robot to move the target object while preventing interference between the target object and surrounding objects.

* * * * *